Patented May 14, 1929.

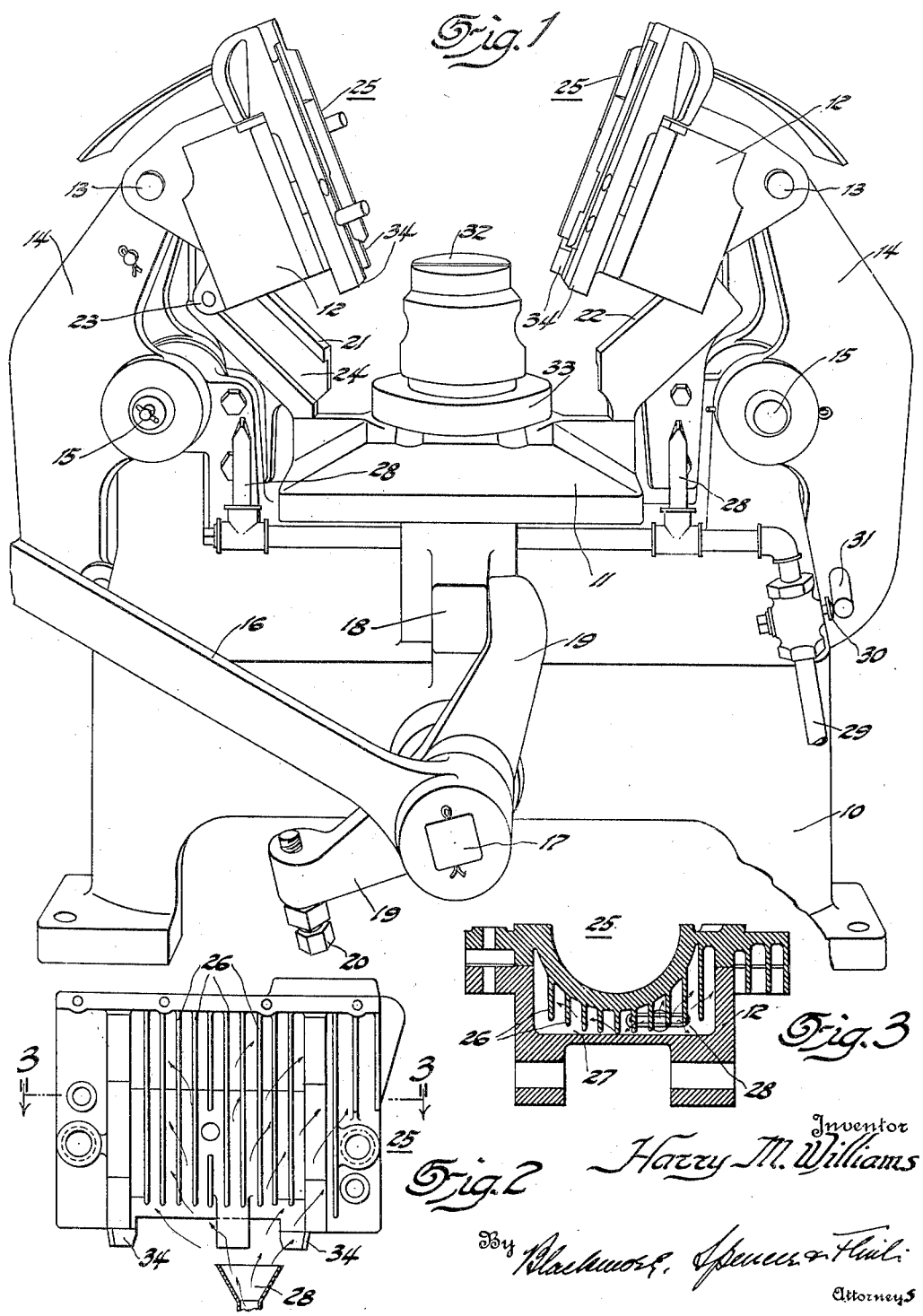

1,712,946

UNITED STATES PATENT OFFICE.

HARRY M. WILLIAMS, OF DAYTON, OHIO, ASSIGNOR TO GENERAL MOTORS RESEARCH CORPORATION, OF DAYTON, OHIO, A CORPORATION OF DELAWARE.

MOLD.

Original application filed April 7, 1925, Serial No. 21,431. Divided and this application filed June 17, 1926. Serial No. 116,571.

This application relates to casting apparatus particularly adapted to the use of a mold of high heat conducting material in casting iron or other metals of relatively high melting point and is a division of application Ser. No. 21,431, filed April 7th, 1925.

An object of the invention is to maintain the mold during casting operations at a suitable temperature. The temperature of molds made of metals of relatively high heat conductivity may be controlled conveniently by causing regulatable fluid currents to flow in contact with them between pours or otherwise. The extent of external surface may be made very large by radiating fins, convolutions, or other alternately disposed projecting and depressed surfaces, so that heat of the mold may be more quickly carried away by radiation and by convection currents.

Even though the melting points of the high heat conducting metals used for molds may be below that of the metal cast in them the heat is conducted away so rapidly and the casting is retained in the mold so short a time that they are not injuriously affected by the heat of the molten metal.

In the accompanying drawings there is illustrated a hand operated mechanism adapted to receive a partible metal mold of high conductivity and to enable the heat from the molds to be conducted away by fluid convection currents applied during the intervals between pours.

Fig. 1 is a perspective of a hand operated apparatus adapted to utilize a mold made in accordance with this invention.

Fig. 2 is a rear view of one of the mold sections detached from the apparatus, and of a nozzle (in section) for blowing cooling air against the mold section.

Fig. 3 is a transverse section through the mold section shown in Fig. 2, on the line 3—3 of Fig. 2, and a holder.

In Fig. 1 numeral 10 indicates a hollow base or frame that carries a core supporting platform 11, and means for operating and guiding two mold holders 12, with attached mold sections. The mold holders 12 are pivoted at 13 to the upper ends of strong levers 14 that are fulcrumed on frame 10 at 15. Levers 14 may be rocked about their fulcrums 15 by means of the hand lever 16 secured to a rock shaft 17 the latter being connected by arms and links (not shown) to the lower ends of the levers. On the frame is a fixed stop 18 with which stop arms 19 rigidly secured to the rock shaft cooperate in order to limit the range of movement of the hand lever and connected mechanism. A screw bolt 20 on one of the arms may be adjusted to vary the arc through which said hand lever can move. Numerals 21 and 22 indicate grooved cam guides bolted to the frame 10. On each holder 12 there is a stud or roller secured to lug 23 which engages in the groove 24 of a cam guide. The guides 21 and 22 are shown reversed with respect to each other so that the groove 24 is not visible in Fig. 1. This is merely for convenience of manufacture.

The mold sections 25 shown in the drawings are the two halves of a piston mold and are made of copper or some other relatively high heat conducting non-ferrous metal. Each mold section is provided with heat dissipating fins 26 or other irregularities providing increased surface for conduction away of heat, on its rear. Between the rear of each mold section and the holder there is a tubular space 27 open at each end for the passage of air currents emitted from nozzles 28 so disposed as to cause currents to flow through said spaces when the mold holders are in wide open position. The nozzles 28 are connected with an air pipe 29 which in turn is connected with any source of air under pressure (not shown). A valve provided with a stem 30 is so disposed in the air pipe that when the lever 14 on one side of the apparatus moves to final open position a trip member 31 thereon actuates the valve stem and opens the valve, permitting air to issue from the nozzles to conduct heat from the mold sections. In Figs. 2 and 3 one air nozzle is shown diagrammatically, displaced considerably from its actual location as shown in Fig. 1, merely for the purpose of indicating its relative position in a horizontal plane with respect to a mold section.

A sand core 32 is shown in position on the core supporting platform 11. The core has an extended circular and concentric base ring 33, which serves by cooperation with the centering lugs 34, projecting from the lower ends of the mold sections, to effect accurate centering of the core with respect to the mold sections as the molds come together when the hand lever 16 is operated for that purpose.

In preparing the copper or other non-ferrous mold sections of high heat conductivity for receiving castings each mold section after suitable cleaning to remove grease or oil may be heated and then the mold surface sprayed with a slurry of very finely divided or impalpable particles of refractory material such as calcined magnesite or oxide of magnesium in a vehicle of water until a lining of desired thickness has been built up. The heat of the mold should be sufficient to cause the coating thus applied to evaporate substantially as fast as it is applied. The so coated mold sections may then be heated to a temperature of say 1100° F. or thereabout, or until the refractory coating becomes dehydrated or sintered into a strong, coherent, highly non-heat-conducting lining. This lining is preferably covered with a coating of lampblack and shellac and then sooted. The mold sections may be secured to the holders at any time after the main refractory lining has been dehydrated.

After the mold sections have been coated and secured in the holders and the core placed on the core platform, the mold sections may be closed. Then molten metal may be poured into the mold. The heat of the molten metal will be conducted evenly throughout the mold. At the expiration of a brief period the mold may be opened and the casting removed. As the mold holders reach the open position valve 30 opens and allows currents of air to flow over the backs of the mold sections to conduct away excessive heat in preparation for the next pour. The valve may be so adjusted as to regulate the volume of air emitted from the air nozzles.

What I claim is:

1. A casting apparatus comprising a mold consisting of a plurality of sections each of which is provided with mechanical irregularities for dissipating heat, means for opening and closing the mold sections, means for directing a supply of cooling fluid over the mold sections, said means being so disposed as to direct said cooling fluid into the mold sections when they are open, and means whereby the carriers initiate the flow of cooling fluid as they reach open position.

2. A casting apparatus comprising a supporting frame, a partible mold, a mold section carrier, there being a tubular space open at opposite ends between the mold carrier and the mold section carried by it, a fluid conductor on the supporting frame having a nozzle disposed in position to discharge air through the tubular space between the mold section and the carrier.

3. A casting apparatus comprising a supporting frame, a partible mold and a mold section carrier, adapted to be moved to open and close the mold, there being a tubular space open at each end for the passage of air currents in contact with the back of the mold section, and means for forcing air through said space, said means being disposed on said supporting frame in position to discharge air into said space when the mold is open.

4. A casting apparatus comprising a supporting frame, a partible mold, a mold section carrier adapted to be moved to open and close the mold, there being a tubular space open at each end for the passage of air currents in contact with the back of the mold section, heat dissipating elements on the mold section projecting into said space, and means for forcing air through said space, said means being disposed on said supporting frame in position to discharge air into said space when the mold is open.

5. A casting apparatus comprising a supporting frame, a partible mold, a mold section carrier moved to open and close the mold, there being a tubular space open at opposite ends for the passage of air currents in contact with the mold section, a fluid conduit on the supporting frame, a nozzle outlet from the conduit, said nozzle outlet being disposed in position to discharge into said space when the mold is open, a valve for controlling the passage of fluid through the nozzle and means on the carrier adapted for operating the valve.

In testimony whereof I affix my signature.

HARRY M. WILLIAMS.